US012621552B2

(12) United States Patent
An

(10) Patent No.: US 12,621,552 B2
(45) Date of Patent: *May 5, 2026

(54) CAMERA MODULE CAPABLE OF ACQUIRING AN ACCURATE IMAGE

(71) Applicant: LG INNOTEK CO., LTD., Seoul (KR)

(72) Inventor: Myoung Jin An, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 184 days.

This patent is subject to a terminal disclaimer.

(21) Appl. No.: 18/543,811

(22) Filed: Dec. 18, 2023

(65) Prior Publication Data

US 2024/0121494 A1 Apr. 11, 2024

Related U.S. Application Data

(63) Continuation of application No. 17/929,913, filed on Sep. 6, 2022, now Pat. No. 11,882,350, which is a
(Continued)

(30) Foreign Application Priority Data

| Jun. 8, 2015 | (KR) | 10-2015-0080414 |
| Feb. 15, 2016 | (KR) | 10-2016-0017308 |

(51) Int. Cl.
*H04N 23/55* (2023.01)
*G03B 1/02* (2021.01)
(Continued)

(52) U.S. Cl.
CPC ............. *H04N 23/55* (2023.01); *G03B 1/02* (2013.01); *G03B 17/00* (2013.01); *G03B 17/02* (2013.01);
(Continued)

(58) Field of Classification Search
CPC ........ H04N 23/55; H04N 23/00; H04N 23/51; H04N 23/54; H04N 23/40; G03B 1/02; G03B 17/00; G03B 17/02; G03B 17/12
See application file for complete search history.

(56) References Cited

U.S. PATENT DOCUMENTS

| 7,304,684 | B2 | 12/2007 | Segawa et al. |
| 8,054,639 | B2 | 11/2011 | Hsu |

(Continued)

FOREIGN PATENT DOCUMENTS

| CN | 2240156 Y | 11/1996 |
| CN | 1450377 A | 10/2003 |

(Continued)

OTHER PUBLICATIONS

International Search Report in International Application No. PCT/KR2016/006030, filed Jun. 8, 2016.
(Continued)

*Primary Examiner* — Chiawei Chen
(74) *Attorney, Agent, or Firm* — Saliwanchik, Lloyd & Eisenschenk

(57) ABSTRACT

One embodiment of a camera module may comprise: a lens barrel provided with at least one lens; a holder to which the lens barrel is coupled; a printed circuit board coupled on the bottom of the holder to face the lens; an adhering portion coupling the holder and the printed circuit board; an opening portion opening a portion of a first space formed through the coupling of the printed circuit board and the holder; and a housing coupled with the holder, wherein a second space separated from the first space may be formed through the coupling of the holder and the housing, and the opening portion may communicate the first space with the second space.

19 Claims, 9 Drawing Sheets

Related U.S. Application Data continuation of application No. 17/135,149, filed on Dec. 28, 2020, now Pat. No. 11,470,231, which is a continuation of application No. 16/665,420, filed on Oct. 28, 2019, now Pat. No. 10,911,655, which is a continuation of application No. 15/735,076, filed as application No. PCT/KR2016/006030 on Jun. 8, 2016, now Pat. No. 10,498,937.

(51) Int. Cl.

| | |
|---|---|
| *G03B 17/00* | (2021.01) |
| *G03B 17/02* | (2021.01) |
| *H04N 23/00* | (2023.01) |
| *H04N 23/51* | (2023.01) |
| *H04N 23/54* | (2023.01) |

(52) U.S. Cl.
CPC ............. *H04N 23/00* (2023.01); *H04N 23/51* (2023.01); *H04N 23/54* (2023.01)

(56) References Cited

U.S. PATENT DOCUMENTS

| | | | |
|---|---|---|---|
| 10,241,240 B1 | 3/2019 | Choi | |
| 10,261,225 B2 | 4/2019 | Lin et al. | |
| 10,498,937 B2 | 12/2019 | An | |
| 10,771,667 B2 | 9/2020 | Jung et al. | |
| 11,336,807 B2* | 5/2022 | Campbell | G03B 17/12 |
| 11,470,231 B2 | 10/2022 | An | |
| 2002/0057468 A1 | 5/2002 | Segawa et al. | |
| 2004/0017501 A1 | 1/2004 | Asaga et al. | |
| 2004/0208497 A1* | 10/2004 | Seger | H04N 13/239 |
| | | | 396/326 |
| 2004/0239794 A1 | 12/2004 | Saito et al. | |
| 2006/0028573 A1 | 2/2006 | Seo et al. | |
| 2006/0203875 A1* | 9/2006 | Frenzel | H04N 23/54 |
| | | | 257/E31.127 |
| 2006/0222300 A1* | 10/2006 | Frenzel | H04N 23/54 |
| | | | 257/E31.127 |
| 2007/0269205 A1 | 11/2007 | Lee et al. | |
| 2008/0267618 A1 | 10/2008 | Lee et al. | |
| 2009/0147115 A1 | 6/2009 | Tanida et al. | |
| 2010/0321555 A1 | 12/2010 | Takeshita et al. | |
| 2011/0063496 A1 | 3/2011 | Chang | |
| 2011/0075024 A1 | 3/2011 | Tso et al. | |
| 2011/0141338 A1 | 6/2011 | Lee et al. | |
| 2011/0234890 A1 | 9/2011 | Kobayashi et al. | |
| 2012/0019940 A1 | 1/2012 | Lu et al. | |
| 2012/0044414 A1 | 2/2012 | Chen et al. | |
| 2012/0056291 A1 | 3/2012 | Suzuki et al. | |
| 2012/0229701 A1 | 9/2012 | Pavithran et al. | |
| 2013/0128100 A1 | 5/2013 | Son | |
| 2013/0235263 A1 | 9/2013 | Ryu | |
| 2014/0022657 A1 | 1/2014 | Lu et al. | |
| 2014/0061438 A1* | 3/2014 | Rohde | H04N 23/55 |
| | | | 250/208.1 |
| 2014/0247389 A1 | 9/2014 | Lee | |
| 2014/0253794 A1 | 9/2014 | Miyazaki et al. | |
| 2015/0103240 A1 | 4/2015 | Kim et al. | |
| 2015/0109469 A1 | 4/2015 | Oh | |
| 2015/0163386 A1 | 6/2015 | Kim et al. | |
| 2015/0222793 A1 | 8/2015 | Kang et al. | |
| 2015/0350500 A1* | 12/2015 | Gutierrez | H04N 23/54 |
| | | | 348/374 |
| 2016/0316117 A1* | 10/2016 | Singh | H04N 23/54 |
| 2017/0219914 A1 | 8/2017 | Sekimoto | |
| 2017/0307841 A1 | 10/2017 | Nakamura et al. | |
| 2018/0084647 A1 | 3/2018 | Nalla et al. | |
| 2019/0246020 A1 | 8/2019 | Winden et al. | |

FOREIGN PATENT DOCUMENTS

| | | |
|---|---|---|
| CN | 1453866 A | 11/2003 |
| CN | 1534999 A | 10/2004 |
| CN | 1617007 A | 5/2005 |
| CN | 101193204 A | 6/2008 |
| CN | 101218653 A | 7/2008 |
| CN | 101339266 A | 1/2009 |
| CN | 102279453 A | 12/2011 |
| CN | 102313959 A | 1/2012 |
| CN | 103620495 A | 3/2014 |
| CN | 104284063 A | 1/2015 |
| CN | 107735726 A | 2/2018 |
| JP | 56-106230 A | 8/1981 |
| JP | 2008-46630 A | 2/2008 |
| JP | 2009-265473 A | 11/2009 |
| JP | 2009-290742 A | 12/2009 |
| JP | 2010-199735 A | 9/2010 |
| KR | 10-2008-0014448 A | 2/2008 |
| KR | 10-2009-0128271 A | 12/2009 |
| KR | 10-2010-0073336 A | 7/2010 |
| KR | 10-2010-0100063 A | 9/2010 |
| KR | 10-2011-0024854 A | 3/2011 |
| KR | 10-1175869 B1 | 8/2012 |
| KR | 10-2013-0059563 A | 6/2013 |
| KR | 10-2014-0111217 A | 9/2014 |
| KR | 10-1444024 B1 | 9/2014 |
| KR | 10-2015-0051683 A | 5/2015 |
| WO | 2015/005713 A1 | 1/2015 |
| WO | 2016/200126 A1 | 12/2016 |

OTHER PUBLICATIONS

Office Action dated Feb. 26, 2018 in Korean Application No. 10-2016-0017308.

Supplementary European Search Report dated Nov. 6, 2018 in European Application No. 16807766.7.

Notice of Allowance dated Jul. 29, 2019 in U.S. Appl. No. 15/735,076.

Office Action dated Feb. 6, 2020 in Chinese Application No. 201680033459.9.

Office Action dated Dec. 10, 2019 in Korean Application No. 10-2019-0007491.

Office Action dated May 15, 2020 in Japanese Application No. 2017-563582.

Extended European Search Report dated Oct. 26, 2020 in European Application No. 20186849.4.

Notice of Allowance dated Sep. 28, 2020 in U.S. Appl. No. 16/665,420.

Office Action dated Jul. 21, 2021 in Korean Application No. 10-2015-0080414.

Office Action dated Jan. 28, 2022 in Chinese Application No. 202110523175.0.

Office Action dated Mar. 1, 2022 in Chinese Application No. 202110523211.3.

Notice of Allowance dated Jun. 22, 2022 in Chinese Application No. 202110523175.0.

Office Action dated Dec. 21, 2021 in U.S. Appl. No. 17/135,149.

Notice of Allowance dated Jun. 6, 2022 in U.S. Appl. No. 17/135,149.

Office Action dated Mar. 9, 2023 in U.S. Appl. No. 17/929,913.

Notice of Allowance dated Sep. 18, 2023 in U.S. Appl. No. 17/929,913.

* cited by examiner

CAMERA MODULE CAPABLE OF ACQUIRING AN ACCURATE IMAGE

CROSS-REFERENCE TO RELATED APPLICATIONS

This application is a continuation of U.S. patent application Ser. No. 17/929,913, filed Sep. 6, 2022; which is a continuation of U.S. patent application Ser. No. 17/135,149, filed Dec. 28, 2020, now U.S. Pat. No. 11,470,231, issued Oct. 11, 2022; which is a continuation of U.S. patent application Ser. No. 16/665,420, filed Oct. 28, 2019, now U.S. Pat. No. 10,911,655, issued Feb. 2, 2021; which is a continuation of U.S. patent application Ser. No. 15/735,076, filed Dec. 8, 2017, now U.S. Pat. No. 10,498,937, issued Dec. 3, 2019; which is the U.S. national stage application of International Patent Application No. PCT/KR2016/006030, filed Jun. 8, 2016, which claims priority to Korean Patent Application Nos. 10-2015-0080414, filed Jun. 8, 2015, and 10-2016-0017308, filed Feb. 15, 2016, the disclosures of each of which are incorporated herein by reference in their entirety.

TECHNICAL FIELD

Embodiments relate to a camera module having a structure that is capable of inhibiting the focal distance between a lens and an image sensor from deviating from a design range in an assembly process, or inhibiting some elements from being deformed or damaged.

BACKGROUND ART

The disclosure described in this part merely provides background information related to embodiments, and does not constitute the related art.

Camera modules may be mounted in vehicles for various purposes. For example, a camera module, which is capable of securing the view behind a vehicle when parking the vehicle, may be mounted on the rear of the vehicle.

In addition, in recent years, a camera module may also be used in a vehicle black box, which is very useful in tracking details of an accident, the reason of an accident, and the like when a traffic accident occurs. In addition, there is the case where a camera module is used as a recognition device for clearly and easily grasping the situation in a blind spot, which is difficult to see with the naked eye by a vehicle driver or a passenger.

The manufacture of a so-called "smart car", i.e. a vehicle equipped with, for example, a collision warning system for detecting in advance the possibility of a collision ahead of or behind the vehicle while driving to prepare for the collision or a collision avoidance system for allowing a control device mounted in the vehicle to directly avoid a collision between vehicles that are driving, without intervention by a driver, has recently gradually increased, and the development of related technologies is increasing.

The use of a camera module, which serves to recognize the external situation of such a smart car, is increasing, and thus the production and technical development of vehicle camera modules are on the rise.

A camera module may be configured such that a lens and an image sensor are disposed at opposite positions in an optical-axis direction. When assembling the camera module, the lens and the image sensor are disposed so that the focal distance therebetween is within a design range.

However, the focal distance may deviate from the design range in the process of assembling the camera module, which is a problem that this needs to be solved.

In addition, some elements may be deformed or damaged in the process of assembling the camera module, which also needs to be solved.

Technical Object

Thus, embodiments relate to a camera module having a structure that is capable of inhibiting the focal distance between a lens and an image sensor from deviating from a design range in an assembly process or inhibiting some elements from being deformed or damaged, and that is also capable of allowing the lens and the image sensor to be aligned parallel to each other.

Technical objects to be achieved by embodiments are not limited to the technical objects as mentioned above, and other unmentioned technical objects will be clearly understood by those skilled in the art from the following description.

Technical Solution

According to one embodiment, a camera module includes a lens barrel having at least one lens, a holder coupled to the lens barrel, a printed circuit board coupled to a lower portion of the holder so as to face the lens, an adhesive element configured to couple the holder and the printed circuit board to each other, an opening configured to open a portion of a first space, which is defined via coupling of the printed circuit board and the holder, and a housing coupled to the holder, wherein the first space is separated from a second space, which is defined via coupling of the holder and the housing, and wherein the first space and the second space communicate with each other through the opening.

The printed circuit board may be coupled to an image sensor, and the image sensor may be disposed in the first space.

The adhesive element may have one side surface disposed so as to be exposed to the second space.

A coupling portion of the holder and the housing may be disposed closer to the lens than the adhesive element in a first direction.

The adhesive element may overlap the housing in a direction orthogonal to a first direction.

The opening may be provided as a first through-hole formed in one side of the adhesive element.

The opening may be provided as a second through-hole formed in the printed circuit board in a first direction.

The second through-hole may be formed inside a curved line, which is defined by the adhesive element.

The opening may be provided as a third through-hole formed in the lower portion of the holder so as to penetrate the holder in a lateral direction.

The opening may be closed after the holder and the printed circuit board are completely coupled to each other.

In the embodiment, the camera module may further include a packing member mounted in a coupling region of the lens barrel and the holder.

According to another embodiment, a camera module includes a lens barrel having at least one lens, a holder coupled to the lens barrel, a printed circuit board coupled to a lower portion of the holder so as to face the lens, a housing coupled to the holder and configured to accommodate the printed circuit board therein, an opening configured to open a portion of a first space, which is defined via coupling of the holder and the printed circuit board, and an adhesive element coupling to a lower surface of the holder and an upper surface of the printed circuit board so as to couple the holder and the printed circuit board to each other, wherein the opening is formed in at least one region of one side of the adhesive element, the printed circuit board, or the lower portion of the holder.

According to a further embodiment, a camera module includes a printed circuit board, an image sensor mounted on the printed circuit board, a holder disposed on the printed circuit board so as to accommodate the image sensor therein and having a first fastening portion and a second fastening portion, which are formed respectively on opposite side surfaces thereof and have a first fastening reference hole and a second fastening reference hole respectively, and a through-hole formed above the image sensor, and a lens barrel fastened to an upper region of the through-hole so as to face the image sensor, wherein the printed circuit board is tilted so that a horizontal plane, which passes through a center of the first fastening reference hole and a center of the second fastening reference hole is parallel to an upper surface of the image sensor, and wherein the horizontal plane, which passes through the center of the first fastening reference hole and the center of the second fastening reference hole, is parallel to an upper surface of a lens mounted in the lens barrel.

The lens barrel may include a protrusion configured to protrude from an outer circumferential surface thereof in a ring form so as to bond to an upper surface of the holder.

The camera module may further include a first adhesive member disposed between a lower end surface of the protrusion and the upper surface of the holder, which faces the protrusion.

The holder may have a lower surface, which faces the printed circuit board, and the camera module may further include a second adhesive member disposed between a bonding surface of the lower surface, which is adjacent to the through-hole, and the printed circuit board.

The camera module may further include a partition disposed between the bonding surface and the through-hole.

The partition may protrude from the lower surface of the holder toward the printed circuit board.

The partition may protrude from an upper surface of the printed circuit board toward the lower surface of the holder.

The bonding surface may have an inclined cross-sectional shape, and a height of a space between the bonding surface of an upper surface of the printed circuit board may increase with increasing distance from the through-hole.

Advantageous Effects

In an embodiment, when air filling a first space expands while an adhesive element is heated for curing, by allowing some of the air to be discharged from the first space through an opening, it is possible to inhibit a change in the focal distance of the camera module beyond a design range, damage to the adhesive element or a printed circuit board, and the like due to the expansion of the air.

Thus, in the embodiment, malfunction of the camera module may be inhibited, as a result of inhibiting a change in the focal distance of the camera module beyond a design range, damage to the adhesive element or the printed circuit board, and the like.

In addition, as a lens and an image sensor are fastened so as to be parallel to each other, it is possible to acquire an accurate image, which is not distorted and is the same as an actual image, from each camera module without the influence of the position at which the camera module is mounted.

DESCRIPTION OF DRAWINGS

FIG. 3 is a side cross-sectional view illustrating a camera module according to the first embodiment.

FIG. 7 is a view for explaining an opening according to a third embodiment.

FIGS. 11a to 11c are views illustrating bonding surfaces of camera modules according to fifth to seventh embodiments.

BEST MODE

Figure 1:
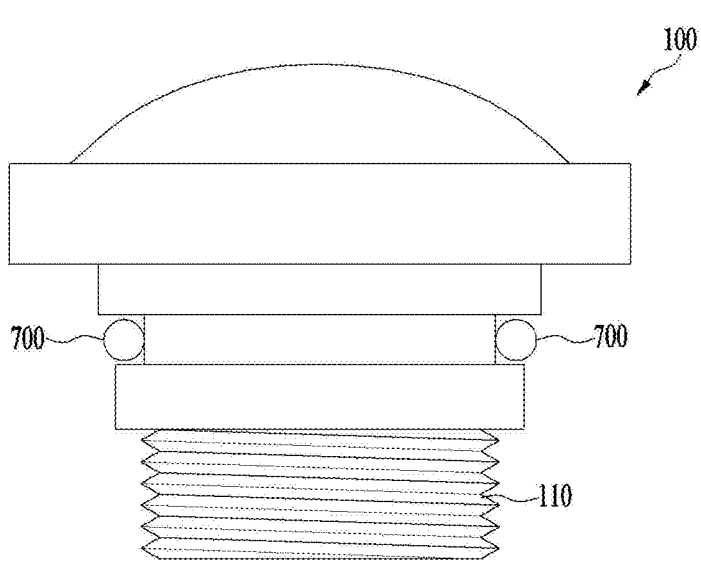
FIG. 1 is a side view illustrating a lens barrel according to a first embodiment.

Hereinafter, embodiments will be described in detail with reference to the accompanying drawings. The embodiments may be modified in various ways and embodied in many alternate forms. Accordingly, while the embodiments are susceptible to various modifications and alternative forms, specific embodiments thereof are shown by way of example in the drawings and will herein be described in detail. It should be understood, however, that there is no intent to limit the embodiments to the particular forms disclosed, but on the contrary, the embodiments are to cover all modifications, equivalents, and alternatives falling within the spirit and scope of the disclosure.

It will be understood that, although the terms "first", "second", etc. may be used herein to describe various elements, these elements should not be limited by these terms. These terms are used simply to discriminate any one element from other elements. In addition, the terms particularly defined in consideration of configurations and operations of the embodiments are intended to describe the embodiments, and are not intended to limit the scope of the embodiments.

In the description of the embodiments, when an element is referred to as being formed "on" or "under" another element, it can be directly "on" or "under" the other element or be indirectly formed with intervening elements therebetween. It will also be understood that "on" or "under" the element may be described relative to the drawings.

In addition, relative terms such as, for example, "first", "second", "on/upper/above" and "beneath/lower/below", used in the following description may be used to distinguish any one substance or element with another substance or element without requiring or containing any physical or logical relationship or sequence between these substances or elements.

In addition, the orthogonal coordinate system (x, y, z) may be used in the drawings. In the drawings, the x-axis and the y-axis indicate planes orthogonal to the optical axis, and for convenience, the optical axis direction (the z-axis) is referred to as a first direction, the x-axis is referred to as a second direction, and the y-axis is referred to as a third direction.

Figure 2:
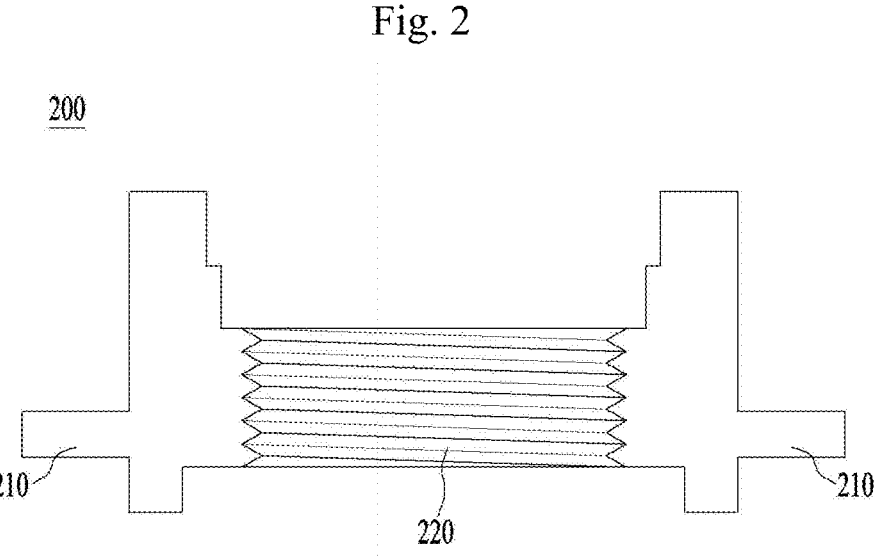
FIG. 2 is a side cross-sectional view illustrating a holder according to the first embodiment.
Figure 3:
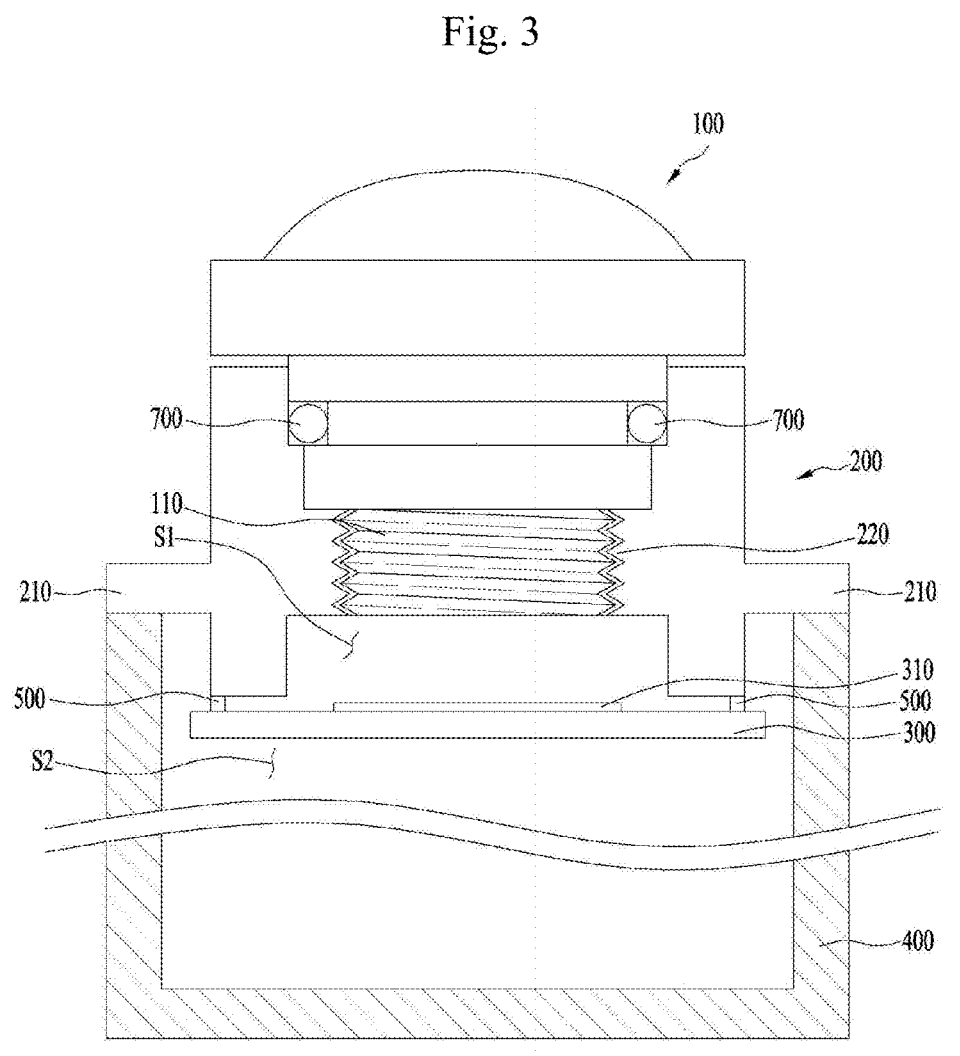

FIG. 1 is a side view illustrating a lens barrel 100 according to a first embodiment. FIG. 2 is a side cross-sectional view illustrating a holder 200 according to the first embodiment. FIG. 3 is a side cross-sectional view illustrating a camera module according to the first embodiment.

As illustrated in FIGS. 1 to 3, the camera module according to the first embodiment may include the lens barrel 100, the holder 200, a printed circuit board 300, a housing 400, an adhesive element 500, an opening, and a packing member 700.

The lens barrel 100 may be provided with at least one lens. The lens coupled to the lens barrel 100 may be configured as a sheet, or two or more lenses may configure an optical system.

The lens barrel 100 may include a first coupling portion 110. When the first coupling portion 110 is coupled to a second coupling portion 220 formed on the holder 200, the lens barrel 100 and the holder 200 may be coupled to each other.

Here, the coupling portions of the holder 200 and the lens barrel 100, i.e. the first coupling portion 110 and the second coupling portion 220 may be disposed closer to the lens than the adhesive element 500 in the first direction.

The first coupling portion 110 and the second coupling portion 220 may be coupled to each other in various ways. For example, the first coupling portion 110 and the second coupling portion 220 may be formed with screw threads, and when the first coupling portion 110 and the second coupling portion 220 are screwed to each other, the lens barrel 100 and the holder 200 may be coupled to each other.

However, the disclosure is not limited thereto, and in another embodiment, an adhesive may be applied between the first coupling portion 110 and the second coupling portion 220 so that the first coupling portion 110 and the second coupling portion 220 may be adhered and thus coupled to each other.

The lens barrel 100 may be coupled to the holder 200. As described above, the holder 200 and the lens barrel 100 may be coupled to each other when the first coupling portion 110 formed on the lens barrel 100 and the second coupling portion 220 formed on the holder 200 are coupled to each other by screwing, adhesive coupling, or the like.

The holder 200 may have a hollow region formed therein. The hollow region may have a shape corresponding to the outer shape of the lens barrel 100. The holder 200 and the lens barrel 100 may be coupled to each other when a portion of the lens barrel 100 is inserted into the hollow region.

The holder 200 may be formed with a protrusion 210. As illustrated in FIG. 3, the protrusion 210 may protrude in the lateral direction from the wall surface of the holder 200. When the holder 200 is coupled to the upper portion of the housing 400, the holder 200 and the housing 400 may be coupled to each other.

The protrusion 210 and the upper portion of the housing 400 may be coupled to each other by, for example, coupling using a fastening element, or adhesive coupling. At this time, in order to inhibit foreign substances from being introduced into the housing 400, a sealing element, such as a packing, may be interposed between the protrusion 210 and the upper portion of the housing 400.

The printed circuit board 300 may be coupled to the lower portion of the holder 200 so as to face the lens. The printed circuit board 300 may be provided with an image sensor 310, which receives light introduced through lenses provided in the lens barrel 100 and forms an image of an object.

The image sensor 310 may be disposed on the printed circuit board 300 so as to face the lens in the optical axis direction, i.e. in the first direction. In addition, the image sensor 310 may be disposed in a first space S1.

Although not illustrated, a plurality of other printed circuit boards 300 may be provided such that the boards are electrically connected to one another, in addition to the board on which the image sensor 310 is mounted.

Figure 4:
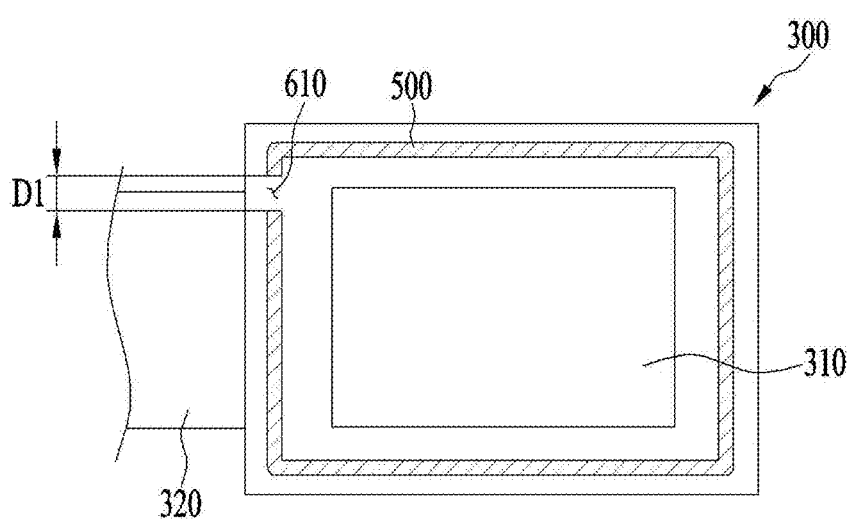
FIG. 4 is a view for explaining an opening according to the first embodiment.

Meanwhile, referring to FIG. 4, a second board 320 may be coupled to the printed circuit board 300. The second board 320 may be formed of a flexible material. The second board 320 may electrically connect the printed circuit board 300 to an external device so as to enable the transmission/reception of electrical signals between the printed circuit board 300 and the external device.

In addition, in the case where a plurality of printed circuit boards 300 is provided, the second board 320 may serve to electrically interconnect the boards.

The packing member 700 may be mounted in the coupling region of the lens barrel 100 and the holder 200. For example, the packing member 700 may be disposed in a part of the coupling region of the lens barrel 100 and the holder 200 excluding the first coupling portion 110 and the second coupling portion 220.

The packing member 700, as illustrated in FIG. 3, may be provided as an O-ring, which surrounds the lens barrel 100. When the lens barrel 100 and the holder 200 are coupled to each other, the packing member 700 may serve to inhibit foreign substances from being introduced into a gap formed between the packing member 700 and the lens barrel 100.

The housing 400 may be coupled to the holder 200, and may accommodate the printed circuit board 300 therein. As described above, when the upper portion of the housing 400 and the protrusion 210 of the holder 200 are coupled to each other, the housing 400 and the holder 200 may be coupled to each other.

When the housing 400 and the holder 200 are coupled to each other, a second space S2 in the housing 400 may be sealed in order to inhibit the introduction of foreign substances from the outside.

The second space S2 may be separated from the first space S1 via the coupling of the holder 200 and the housing 400. In addition, the second space S2 may be separated from the first space S1 by the printed circuit board 300.

The adhesive element 500, as illustrated in FIG. 3, may be coupled to the lower surface of the holder 200 and the upper surface of the printed circuit board 300, thereby serving to couple the holder 200 and the printed circuit board 300 to each other. At this time, one side surface of the adhesive element 500 may be disposed so as to be exposed to the second space S2.

At this time, the adhesive element 500 may be disposed so as to overlap the housing 400 in the second direction and/or the third direction, which is orthogonal to the first direction. In addition, the adhesive element 500 may be formed on the lower surface of the holder 200 and the upper surface of the printed circuit board 300.

Referring to FIG. 4, the adhesive element 500 may be formed in a curvilinear form along the edges of the lower surface of the holder 200 and the upper surface of the printed circuit board 300. The adhesive element 500 may be formed by applying an adhesive to the lower surface of the holder 200 and/or the upper surface of the printed circuit board 300.

As illustrated in FIG. 4, since the entire printed circuit board 300 has a rectangular shape in the embodiment, the adhesive element 500 may be formed in a rectangular curvilinear form so as to correspond to the shape of the printed circuit board.

The process of coupling the printed circuit board 300 to the holder 200 via the adhesive element 500 may be performed as an active alignment process. In the embodiment, the active alignment process is a process of moving the printed circuit board 300 in the first direction so as to adjust the focal distance between the lens and the image sensor 310, which are provided so as to face each other, or a process of tilting the printed circuit board 300 in the x-y plane, which is orthogonal to the first direction, so as to adjust the focal distance between the optical axis of the lens and the image sensor 310.

In order to perform the active alignment process, the adhesive element 500 may be partially cured as appropriate while the active alignment process is performed, and may then be completely cured after the active alignment process is completed.

The adhesive used to form the adhesive element 500 may be, for example, a hybrid adhesive, which is cured in response to both ultraviolet light and heat.

While the active alignment process is performed, the adhesive element 500 may be partially cured by irradiating the adhesive element 500 with ultraviolet light in the state in which the focal distance between the lens and the image sensor 310 is adjusted.

After the active alignment process is completed, the adhesive element 500 may be completely cured by heating the adhesive element 500. At this time, for example, the adhesive element 500 may be heated using an oven or the like.

When the lens barrel, the holder 200, and the printed circuit board 300 are coupled to one another via the active alignment process, the first space S1 may be formed in the camera module so as to be sealed at the upper side thereof by the packing member 700 and be sealed at the lower side thereof by the adhesive element 500.

When a coupled structure of the lens barrel, the holder 200, and the printed circuit board 300 is heated in order to completely cure the adhesive element 500, the air filling the first space S1 may expand due to heating.

Due to the expansion of the air filling the first space S1, the printed circuit board 300 may swell, be deformed, or be changed in position. In this case, due to the active alignment process, the focal distance between the lens and the image sensor 310, which has been adjusted to fall within a design range, may deviate from the design range.

In addition, due to the expansion of the air filling the first space S1, the adhesive element 500 or the printed circuit board 300 may be damaged. A change in focal distance beyond the design range, damage to the adhesive element 500 or the printed circuit board 300, or the like may cause malfunction of the camera module.

Therefore, in order to suppress the occurrence of malfunction of the camera module due to the expansion of the air filling the first space S1, the camera module in the embodiment may be formed with an opening, through which the air filling the first space S1 may be discharged from the first space S1.

That is, when the air filling the first space S1 expands while the adhesive element 500 is heated so as to be cured, some of the filled air is discharged from the first space S1 through the opening, which may inhibit a change in the focal distance of the camera module beyond the design range, damage to the adhesive element 500 or the printed circuit board 300, and the like, due to the expansion of the air.

Accordingly, the camera module in the embodiment may inhibit a change in the focal distance of the camera module beyond the design range, damage to the adhesive element 500 or the printed circuit board 300, and the like, thereby inhibiting the occurrence of malfunction.

The opening may serve to open a portion of the first space S1, which is formed by the coupling of the holder 200 and the printed circuit board 300. At this time, the opening may be formed in at least one region of one side of the adhesive element 500, the printed circuit board 300, and the lower portion of the holder 200. Hereinafter, respective embodiments of the opening will be described with reference to FIGS. 4 to 7.

Figure 5:
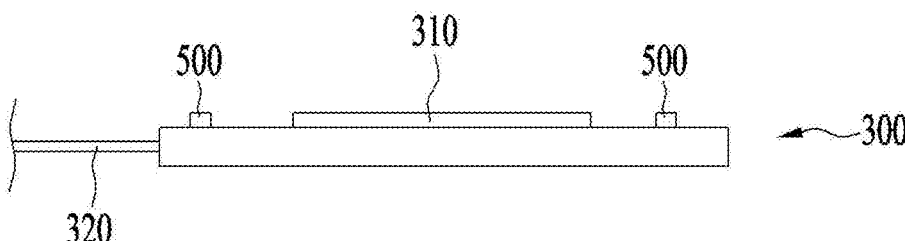
FIG. 5 is a side cross-sectional view of FIG. 4.

FIG. 4 is a view for explaining an opening according to the first embodiment. FIG. 5 is a side cross-sectional view of FIG. 4. In the embodiment, as illustrated in FIG. 4, the opening may include a first through-hole 610, which is formed in one side of the adhesive element 500.

Since the first through-hole 610 is formed in the adhesive element 500, when the adhesive element 500 is heated for curing, the coupling of the housing 400 is performed after the coupling of the printed circuit board 300 is performed. Therefore, some of the air, which has filled the first space S1 and expanded due to heating, may be discharged outward through the first through-hole 610.

That is, since the first through-hole 610 enables the first space S1 to communicate with the outside, when the air present in the first space S1 is heated, some of the air may move from the first space S1 to the outside.

With this structure, even while the adhesive element 500 is heated, deformation of the printed circuit board, a change in focal distance, or the like, which occurs due to the expansion of the air present in the first space S1, may be inhibited.

The width D1 of the first through-hole 610 may range, for example, from 0.1 mm to 0.3 mm. However, the width may be greater or less than this range in consideration of the size of the entire camera module and the arrangement of the respective components.

Meanwhile, in the embodiment of FIG. 4, one first through-hole 610 is formed in the edge region of the adhesive element 500, but the disclosure is not limited thereto. That is, the first through-hole 610 may be formed in the corner region of the adhesive element 500, and two or more first through-holes may be provided.

The cross section of the first through-hole 610 may have any of various shapes such as, a circular shape, an oval shape, a rectangular shape, or a polygonal shape.

Figure 6:
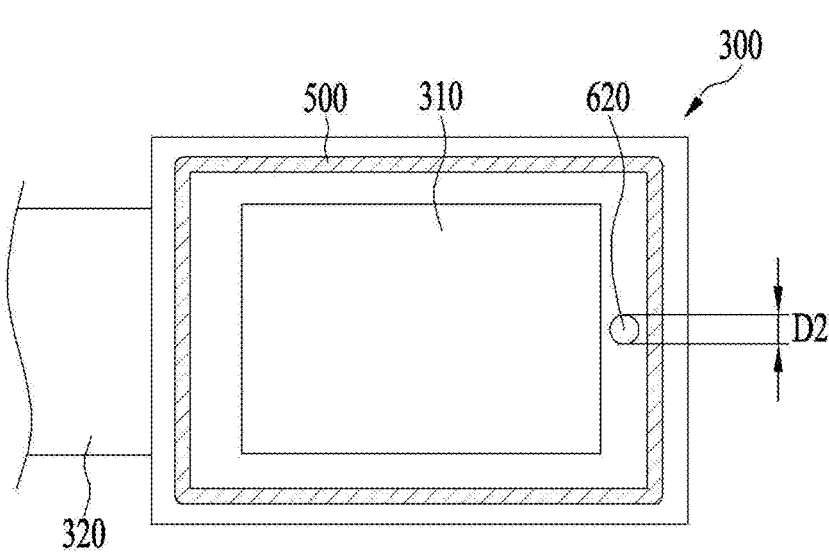
FIG. 6 is a view for explaining an opening according to a second embodiment.

FIG. 6 is a view for explaining an opening according to a second embodiment. In another embodiment of the opening, as illustrated in FIG. 6, the printed circuit board 300 may be provided with a second through-hole 620, which is formed in the first direction. For example, the second through-hole 620 may be provided as a via-hole in the printed circuit board 300.

The second through-hole 620 may be formed in the printed circuit board 300. Thus, when the adhesive element 500 is heated for curing, some of the air, which has filled the first space S1 and expanded due to heating, may be discharged outward through the second through-hole 620.

That is, since the second through-hole 620 enables the first space S1 to communicate with the outside, when the air present in the first space S1 is heated, some of the air may move from the first space S1 to the outside.

With this structure, even while the adhesive element 500 is heated, deformation of the printed circuit board, a change in focal distance, and the like, which occur due to the expansion of the air present in the first space S1, may be inhibited.

The second through-hole 620 may be formed inside the curved line defined by the adhesive element 500. That is, referring to FIG. 6, the second through-hole 620 may be formed between the image sensor 310 and the adhesive element 500. With this structure, the adhesive element 500 may form the first space S1, and the second through-hole 620 may allow the first space S1 to communicate with the outside.

The width D2 of the second through-hole 620 may range, for example, from 0.1 mm to 0.3 mm, and more appropriately, may be about 2 mm. However, the width may be greater or less than this range in consideration of the size of the entire camera module and the arrangement of the respective components.

Meanwhile, in the embodiment of FIG. 6, one second through-hole 620 is formed in the edge region of the adhesive element 500, but the disclosure is not limited thereto. That is, the second through-hole 620 may be formed in an appropriate position between the image sensor 310 and the adhesive element 500, and two or more second through-holes may be provided.

The cross section of the first through-hole 620 may have a circular shape in the embodiment of FIG. 6, without the limitation thereto, and may have any of various shapes such as, an oval shape, a rectangular shape, or a polygonal shape.

Figure 7:
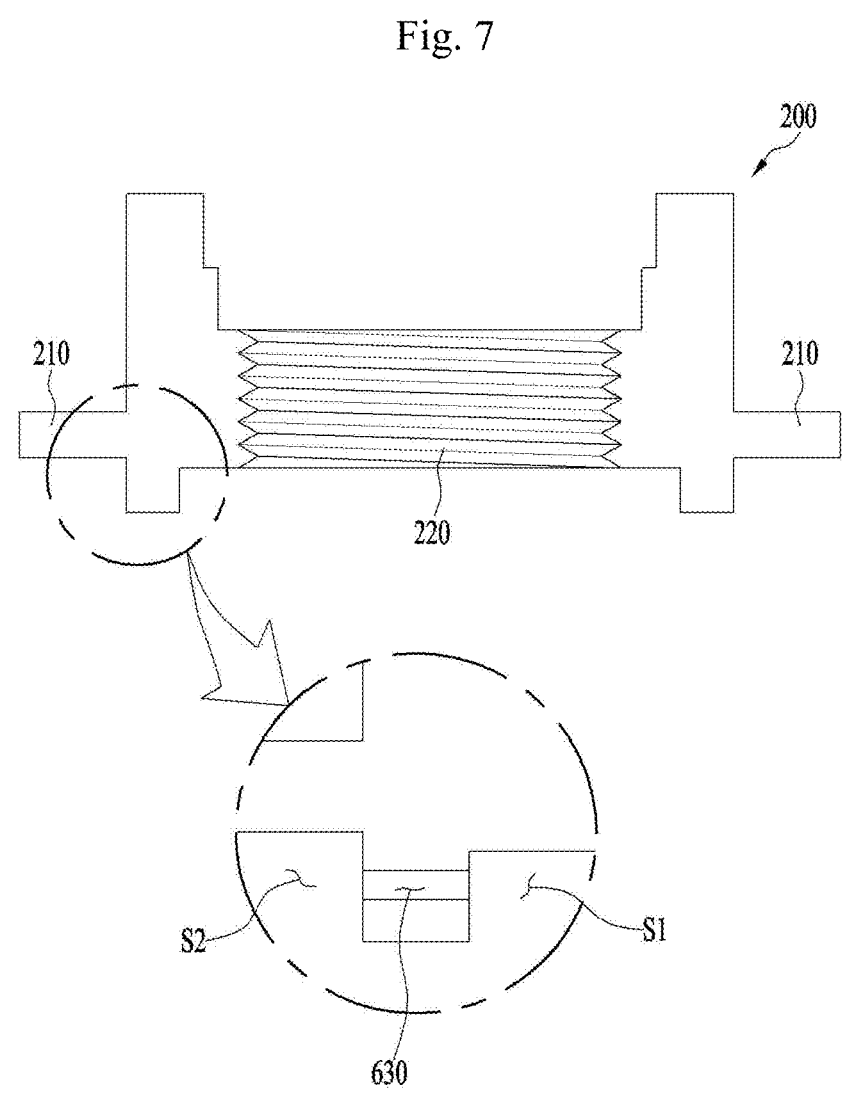

FIG. 7 is a view for explaining an opening according to a third embodiment. In another embodiment of the opening, as illustrated in FIG. 7, a third through-hole 630 may be formed in the lower portion of the holder 200 so as to penetrate the holder 200 in the lateral direction.

For example, as illustrated in FIG. 7, the third through-hole 630 may be formed in the lower portion of the holder 200, i.e. below the protrusion 210 in the lateral direction of the holder 200.

The third through-hole 630 may be formed in the holder 200 so as to penetrate the holder in the lateral direction. Thus, when the adhesive element 500 is heated for curing, some of the air, which has filled the first space S1 and expanded due to heating, may be discharged outward through the second through-hole 630.

That is, since the third through-hole 630 enables the first space S1 to communicate with the outside, when the air present in the first space S1 is heated, some of the air may move from the first space S1 to the outside.

With this structure, even while the adhesive element 500 is heated, deformation of the printed circuit board, a change in focal distance, and the like, which occur due to the expansion of the air present in the first space S1, may be inhibited.

The width D3 of the third through-hole 630 may range, for example, from 0.3 mm to 0.5 mm. However, the width may be greater or less than this range in consideration of the size of the entire camera module and the arrangement of the respective components.

Meanwhile, in the embodiment of FIG. 7, one third through-hole 630 is formed, but the disclosure is not limited thereto. That is, two or more third through-hole 630 may be formed in the lower portion of the holder 200 so as to penetrate the holder in the lateral direction.

The cross section of the third through-hole 630 may have any of various shapes such as, a circular shape, an oval shape, a rectangular shape, or a polygonal shape.

Meanwhile, when the coupling of the printed circuit board 300 and the housing 400 is completed, the opening may allow the first space S1 to communicate with the second space S2, which is formed inside the housing 400.

Due to the formation of the opening, malfunction of the camera module may occur when foreign substances of the outside are introduced into the first space S1 through the opening to thereby be adhered to elements, such as the image sensor 310.

Therefore, when the opening is provided so as to enable the first space S1 and the second space S2 to communicate with each other and the holder 200 and the housing 400 are coupled to each other so as to seal the second space S2, the first space S1 and the second space S2 may communicate with each other, but the first space S1 and second space S2 may be collectively sealed.

With this structure, even though the opening is formed, it is possible to inhibit foreign substances from being introduced from the outside into the first space S1, and thus to inhibit malfunction of the camera module due to the introduction of foreign substances into the first space S1.

Meanwhile, in order to more reliably inhibit foreign substances from being introduced into the first space S1 through the opening, the opening may be closed after the coupling of the holder 200 and the printed circuit board 300 is completed. The closing of the opening may be performed before the housing 400 is coupled to the holder 200.

As described above, since the opening functions only in the process of coupling the holder 200 and the printed circuit board 300 to each other using the adhesive element 500 via the active alignment process, the opening is not necessary after the adhesive element 500 is heated to thereby be completely cured.

Therefore, after the coupling of the holder 200 and the printed circuit board 300 is completed, the opening may be closed in order to inhibit foreign substances from being introduced from the outside into the first space S1 through the opening.

When the opening is closed, the opening may be closed using an adhesive. The adhesive may be, for example, a thermo-setting adhesive, an ultraviolet-curable adhesive, or the aforementioned hybrid adhesive.

Figure 8:
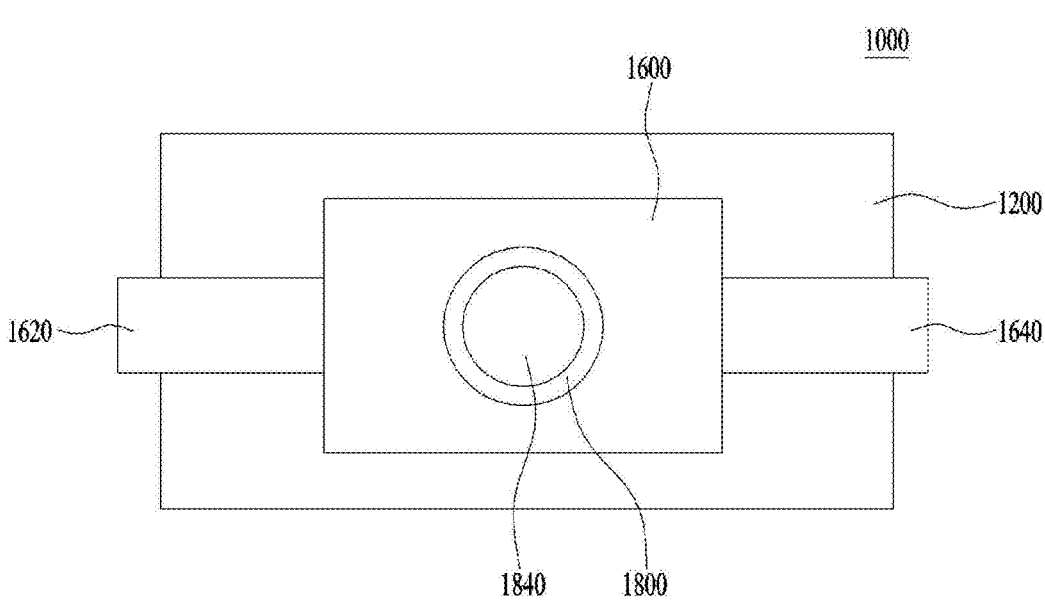
FIG. 8 is a plan view illustrating a camera module according to the fourth embodiment.
Figure 9:
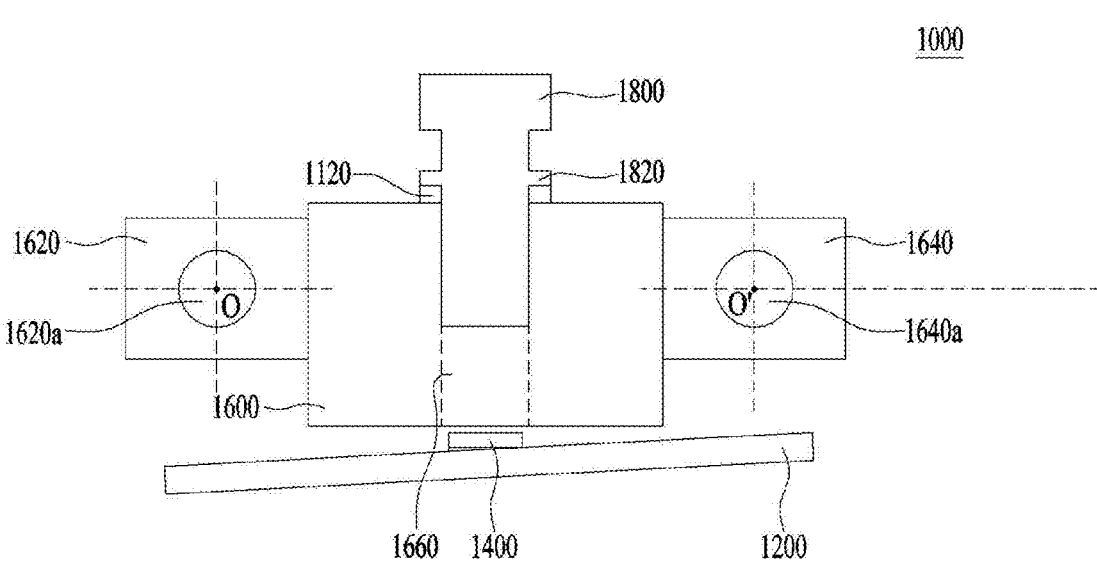
FIG. 9 is an exploded cross-sectional view illustrating the camera module according to the fourth embodiment.
Figure 10A:
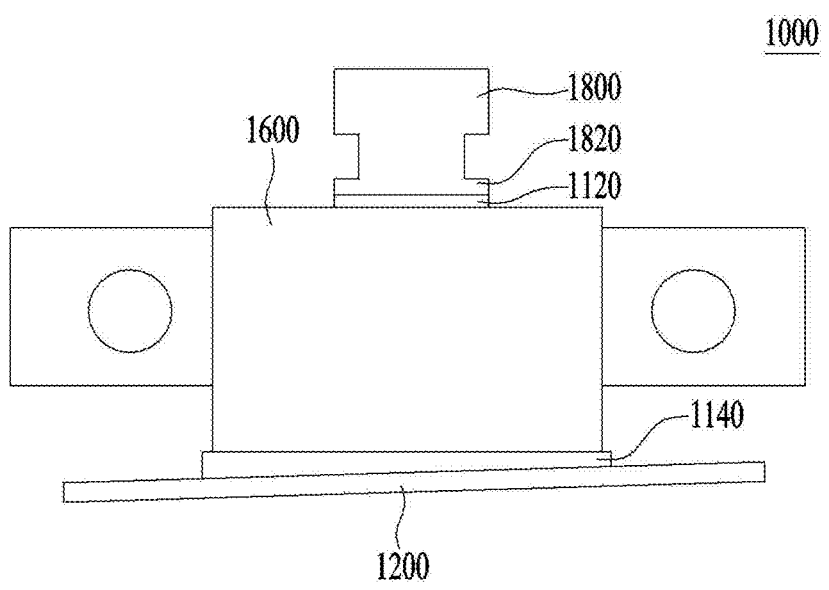
FIG. 10a is a side view illustrating the camera module according to the fourth embodiment.
Figure 10B:
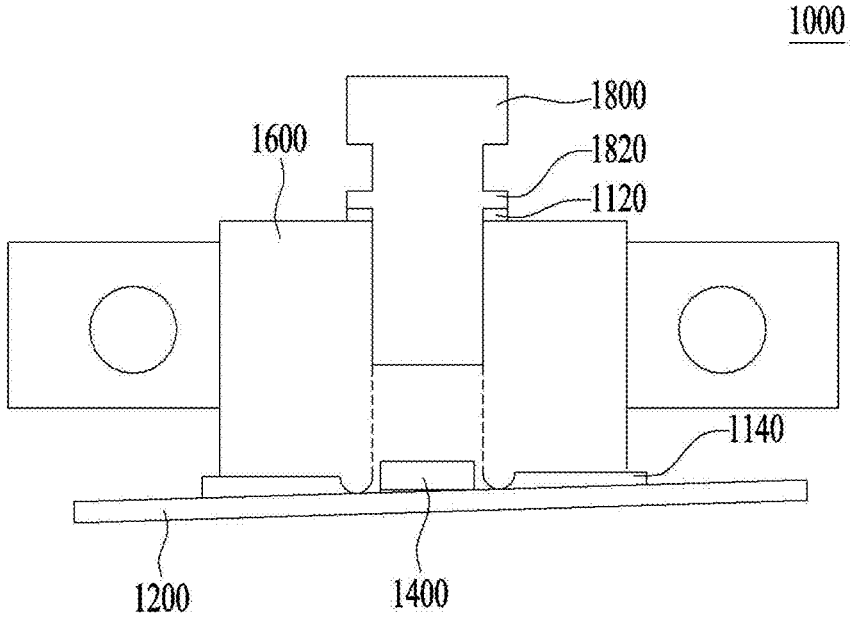
FIG. 10b is a cross-sectional view illustrating the camera module according to the fourth embodiment.

FIG. 8 is a plan view illustrating a camera module according to the fourth embodiment, FIG. 9 is an exploded cross-sectional view illustrating the camera module according to the fourth embodiment, FIG. 10a is a side view illustrating the camera module according to the fourth embodiment, and FIG. 10b is a cross-sectional view illustrating the camera module according to the fourth embodiment.

Referring to FIGS. 8 to 10b, the camera module 1000 according to the present embodiment includes a printed circuit board 1200, an image sensor 1400 mounted on the printed circuit board 1200, a holder 1600, which is disposed on the printed circuit board 1200 so as to accommodate the image sensor 1400 therein, and a lens barrel 1800 fastened to the holder 1600.

In the fourth embodiment, the image sensor 1400 may be mounted on the printed circuit board 1200.

Here, the image sensor 1400 may generate an image signal by collecting light introduced thereinto, and may be provided as a complementary metal oxide semiconductor (CMOS) sensor or a charge coupled device (CCD) sensor.

In addition, the holder 1600 may be disposed on the printed circuit board 1200 so as to accommodate therein the image sensor 1400, which is mounted on the printed circuit board 1200.

In addition, the holder 1600 may be provided with a first fastening portion 1620 and a second fastening portion 1640, which are symmetrically formed on opposite side surfaces of the holder. The first fastening portion 1620 and the second fastening portion 1640 may be formed in a plate shape in the longitudinal direction of the holder. The first fastening portion 1620 and the second fastening portion 1640 may be respectively formed with a first fastening reference hole 1620a and a second fastening reference hole 1640a.

The first fastening portion 1620 and the second fastening portion 1640 may be fastened to a position at which the camera module may be mounted, so as to fix the camera module.

In addition, the holder 1600 may have a through-hole 1660 formed above the image sensor 1400.

In addition, the lens barrel 1800 may be fastened to the upper region of the through-hole 1660 formed in the holder 1600. The lens barrel 1800 may be disposed so as to face the image sensor 1400, which is mounted on the printed circuit board 1200.

Here, the inner diameter of the through-hole 1660 may correspond to the outer diameter of the lens barrel 1800. The lens barrel 1800 may include a protrusion 1820, which protrudes from the outer circumferential surface of the lens barrel in a ring form so as to bond to the upper surface of the holder 1600.

In addition, the protrusion 1820 may fix the lens barrel 1800 at a predetermined height in the through-hole 1660, and a first adhesive member 1120 may be disposed between the lower end surface of the protrusion 1820 and the upper surface of the holder, which faces the protrusion 1820, so as to attach and fasten the holder 1600 and the lens barrel 1800 to each other.

Here, the first adhesive member may be formed of an ultraviolet-curable adhesive, which may be solidified within a short time via reaction of a light reaction initiator contained in a liquid-phase adhesive by irradiating the adhesive with ultraviolet light, without limitation thereto.

Meanwhile, at least one lens may be disposed in the inner space of the lens barrel 1800, and a plurality of lenses may be stacked at a predetermined interval in the inner space.

Conventionally, when a holder and a lens barrel are fastened to a printed circuit board on which an image sensor is mounted, the printed circuit board on which the holder and the image sensor are mounted is horizontally aligned, and thereafter the optical axis of a lens disposed in the lens barrel is aligned. As such, when the image sensor mounted on the printed circuit board is not horizontally aligned with respect to the printed circuit board, an accurate image may not be acquired.

In the fourth embodiment, the printed circuit board 1200 may be tilted so that the horizontal plane, which passes through the center O of the first fastening reference hole and the center O' of the second fastening reference hole, is parallel to the upper surface of the image sensor 1400. Here, the positions of the holder and the image sensor may be respectively measured using, for example, a laser displacement sensor so that the printed circuit board and the holder are primarily aligned with each other via tilting of the printed circuit board.

Then, the holder and the printed circuit board, which have been primarily aligned with each other, may be attached and fixed to each other via a second adhesive member, which will be described later.

As described above, after the holder and the printed circuit board are aligned with each other so that the horizontal plane, which passes through the center O of the first fastening reference hole and the center O' of the second fastening reference hole, is parallel to the upper surface of the image sensor 1400, the optical axis of the lens disposed in the lens barrel may be aligned so that the horizontal plane, which passes through the center O of the first fastening reference hole and the center O' of the second fastening reference hole, is parallel to the upper surface of the lens mounted in the lens barrel.

Then, the lens barrel including the lens, the optical axis of which has been aligned, and the holder are attached and fixed to each other via the first adhesive member.

In this way, the printed circuit board may be tilted so that the horizontal plane, which passes through the center O of the first fastening reference hole and the center O' of the second fastening reference hole, the upper surface of the image sensor 1400, and the upper surface of the lens are parallel to one another and so that the image sensor 140 is parallel to the horizontal plane, which passes through the center O of the first fastening reference hole and the center O' of the second fastening reference hole, and in such a tilted state of the printed circuit board, the camera module may be mounted at a desired mounting position thereof.

Accordingly, an undistorted image, which is the same as an actual image, may be acquired without the influence of the angle at which the image sensor is mounted.

Meanwhile, the lower surface of the holder 1600 may face the printed circuit board 1200, and a second adhesive member 1140 may be disposed between the printed circuit board 1200 and a bonding surface 1680 of the lower surface, which is adjacent to the through-hole 1660.

Here, the second adhesive member may be formed of an ultraviolet-curable adhesive, which may be solidified within a short time via a reaction of a light reaction initiator contained in a liquid-phase adhesive by irradiating the adhesive with ultraviolet light, without limitation thereto.

Figures 11A, 11B:
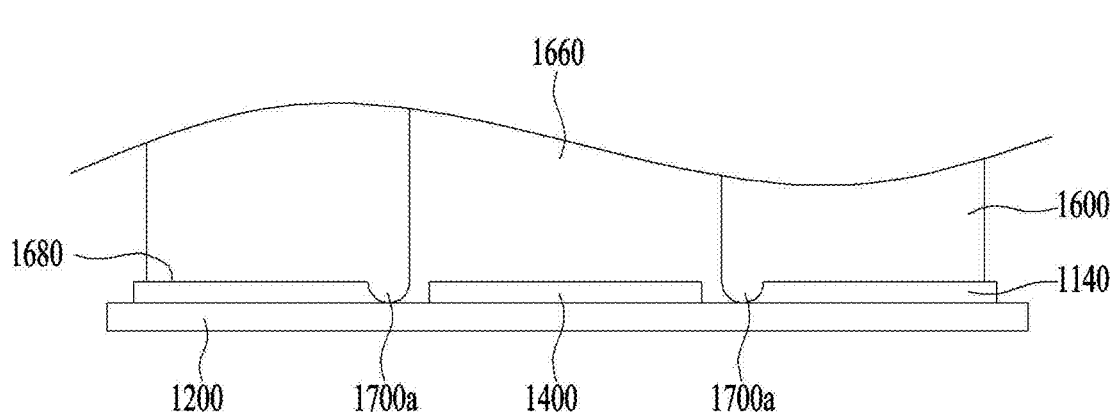
Figure 11C:
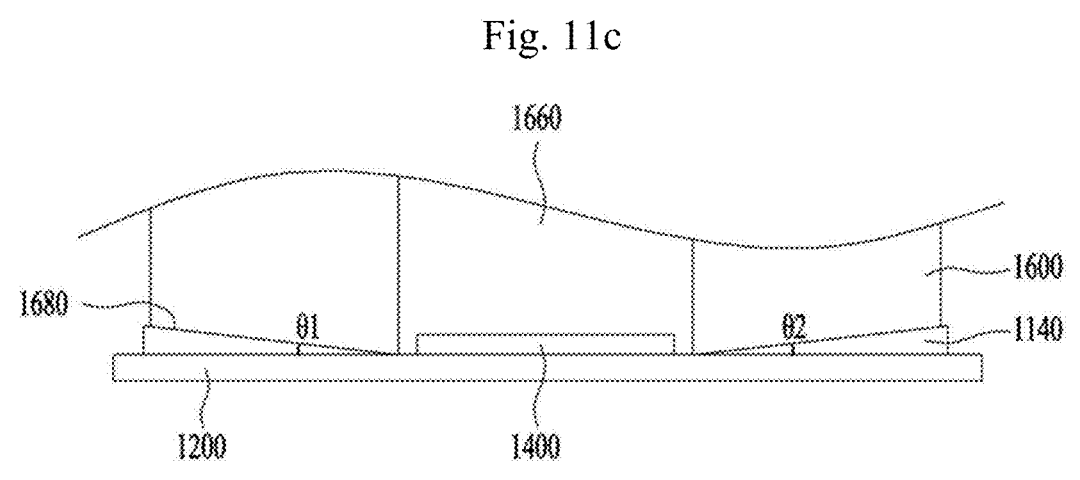

FIGS. 11a to 11c are views illustrating bonding surfaces of camera modules according to fifth to seventh embodiments.

Referring to FIGS. 11a to 11c, partitions 1700a and 1700b may be disposed between the bonding surface 1680 and the through-hole 1660. The partitions 1700a and 1700b may inhibit the second adhesive member 1140, which is disposed between the bonding surface 1680 of the holder and the printed circuit board 1200, from spreading to the image sensor 1400.

As illustrated in FIG. 11a, the partition 1700a may be disposed so as to protrude from the lower surface of the holder 1600 toward the printed circuit board 1200, and may be formed in a ring shape so that the inner diameter thereof is equal to or greater than the inner diameter of the through-hole 1600. Here, when the inner diameter of the partition 1700a is much greater than the inner diameter of the through-hole 1600, the area over which the second adhesive member is disposed between the bonding surface 1680 of the holder 1600 and the printed circuit board 1200 may be reduced, which may deteriorate adhesive force. Therefore, the partition may be disposed at a position at which deterioration in adhesive force may not occur.

In addition, the partition 1700a may be formed such that the side cross section of the partition 1700a has an oval shape to enable the tilting of the printed circuit board 1200, without limitation thereto.

As illustrated in FIG. 11b, the partition 1700b may be disposed so as to protrude from the upper surface of the printed circuit board 1200 toward the lower surface of the holder. In the same manner as the embodiment illustrated in FIG. 11a, the partition 1700b may be formed in a ring shape such that the inner diameter thereof is equal to or greater than the inner diameter of the through-hole 1660 in the holder.

In addition, the partition 1700a may be formed such that the side cross section of the partition 1700a has an oval shape to enable the tilting of the printed circuit board 1200, without the limitation thereto.

Meanwhile, the height of the partitions 1700a and 1700b may be changed depending on the amount of the second adhesive member 1140, which is disposed between the bonding surface 1680 and the printed circuit board 1200. The height of the partitions 1700a and 1700b may range from 10 μm to 200 μm.

Here, when the height of the partitions 1700a and 1700b is below 10 μm, the second adhesive member 1140, which is disposed between the bonding surface 1680 and the printed circuit board 1200, may be applied so as to be excessively thin, which may deteriorate adhesive force. When the height of the partitions is above 200 μm, the second adhesive member 1140, which is disposed between the bonding surface 1680 and the printed circuit board 1200, may be applied so as to be excessively thick, which may cause the holder to be pushed from the printed circuit board, resulting in deterioration in fixing force.

In addition, the height of the partitions 1700a and 1700b may be changed depending on the amount of the second adhesive member, which depends on the area of the lower cross section of the holder 1600 or the material of the second adhesive member.

As illustrated in FIG. 11c, the bonding surface 1680 according to the seventh embodiment may have an inclined cross-sectional shape, and the height of the space between the bonding surface 1680 and the upper surface of the printed circuit board 1200 may increase with increasing distance from the through-hole 1660.

The second adhesive member 1140 may be disposed in the space between the bonding surface 1680 and the upper surface of the printed circuit board 1200. With a structure in which the height of the space between the bonding surface 1680 and the upper surface of the printed circuit board 1200 increases with increasing distance from the through-hole 1660, it is possible to inhibit the second adhesive member from spreading to the image sensor.

In addition, with regard to the inclination angles θ1 and θ2 of the bonding surface, as the printed circuit board 1200 tilts, the first inclination angle θ1 of the bonding surface and the second inclination angle θ2 of the bonding surface may be different from each other. Based on the inclination of the printed circuit board, the second inclination angle θ2 of the bonding surface may be increased in proportion to a reduction in the first inclination angle θ1 of the bonding surface, or the second inclination angle θ2 of the bonding surface may be reduced in proportion to an increase in the first inclination angle θ1 of the bonding surface.

In addition, the inclination angles θ1 and θ2 of the bonding surface may range from 0.5° to 1.5°. When the first inclination angle θ1 of the bonding surface or the second inclination angle θ2 of the bonding surface is below 0.5°, the second adhesive member 1140, which is disposed between the bonding surface and the printed circuit board, may be reduced in thickness, which may deteriorate adhesive force. When the first inclination angle θ1 of the bonding surface or the second inclination angle θ2 of the bonding surface is above 1.5°, an excessive amount of the second adhesive member 1140 may be disposed on the edge portion of the lower surface of the holder 1600, which may deteriorate support force.

In addition, the bonding surface 1680 may have roughness, which may increase the adhesive force of the bonding surface and the second adhesive member. In addition, although the magnitude of roughness may range from 1 μm to 5 μm, the magnitude of roughness may be changed depending on the area or material of the bonding surface of the holder 1600.

The embodiments described above may be combined with each other.

That is, the inclined bonding surface 1680 may be provided and the partition 1700a may protrude from the lower surface of the holder 1600 toward the printed circuit board 1200. Alternatively, the inclined bonding surface 1680 may be provided and the partition 1700b may protrude from the upper surface of the printed circuit board 1200 toward the lower surface of the holder 1600.

As described above, according to the embodiments, when the lens and the image sensor are fastened so as to be parallel to each other, it is possible to acquire an accurate image, which is not distorted and is the same as an actual image, from each camera module without the influence of the position at which the camera module is mounted.

Although several embodiments have been described above, various other embodiments may be implemented. The technical ideas of the embodiments described above may be combined with each other in various forms so long as they are compatible, and new embodiments may be realized therefrom.

MODE FOR INVENTION

Various embodiments have sufficiently been described in the best mode to implement the disclosure.

INDUSTRIAL APPLICABILITY

According to embodiments, malfunction of a camera module may be inhibited by inhibiting, for example, damage to an adhesive element or a printed circuit board. In addition, as a lens and an image sensor are fastened so as to be parallel to each other, it is possible to manufacture the camera module, which is capable of acquiring an accurate image, which is not distorted and is the same as an actual image, from each camera module without the influence of the position at which the camera module is mounted. The camera module may be applied to, for example, a mobile communication terminal.

The invention claimed is:

1. A camera module comprising:
a lens barrel on which at least one lens is disposed;
a holder on which the lens barrel is disposed;
a substrate coupled to the holder and on which an image sensor is disposed;
an adhesive element disposed on an upper surface of the substrate to couple the holder and the substrate;
a first space formed below the holder by coupling the holder and the substrate; and
an opening through the adhesive member, wherein the opening connects the first space and an outside of the camera module, and wherein the opening opens a portion of the first space in a direction perpendicular to an optical axis of the lens.

2. The camera module according to claim 1, wherein the holder includes a first protrusion protruded from a lower portion of the holder in a direction parallel to the optical axis of the lens, and the adhesive member and the opening are disposed between the first protrusion and the upper surface of the substrate.

3. The camera module according to claim 2, wherein the opening is at least one hole penetrating the first protrusion in a direction parallel to the optical axis of the lens.

4. The camera module according to claim 3, wherein the hole has a width of 0.3 mm to 0.5 mm.

5. The camera module according to claim 1, comprising a housing that accommodates the substrate therein and coupled to the holder; and a second space formed outside of the first space by coupling the holder and the housing, and wherein the opening connects the first space and the second space.

6. The camera module according to claim 5, wherein the holder includes a second protrusion protruded in a direction perpendicular to the optical axis of the lens, and the housing is coupled to the second protrusion.

7. The camera module according to claim 6, wherein the housing overlaps with the substrate in a direction perpendicular to the optical axis.

8. A camera module comprising:

a substrate on which an image sensor is disposed;

a holder disposed on the substrate;

a lens barrel disposed above the holder and on which at least one lens is disposed;

an adhesive member disposed in a closed curve on an upper surface of the substrate to couple the holder and the substrate;

a first space formed below the holder by coupling the holder and the substrate;

a housing accommodating the substrate therein and coupled to the holder; and an opening formed through a portion of an area formed by the closed curve of the adhesive member on the upper surface of the substrate to open a portion of the first space in a direction perpendicular to an optical axis of the lens, wherein the holder includes a second protrusion protruded from an outer surface of the holder in the direction perpendicular to the optical axis of the lens, and the housing is coupled to the second protrusion.

9. The camera module according to claim 8, wherein the holder includes a first protrusion protruded from a lower portion of the holder in a direction parallel to the optical axis of the lens, and the adhesive member and the opening are disposed between the first protrusion and the upper surface of the substrate.

10. The camera module according to claim 8, comprising a second space formed outside the first space by coupling the holder and the housing, wherein the opening connects the first space and the second space.

11. The camera module according to claim 8, wherein the housing overlaps with the substrate in a direction perpendicular to the optical axis.

12. A camera module comprising:

a lens barrel on which at least one lens is disposed;

a holder on which the lens barrel is disposed;

a substrate on which an image sensor is disposed and coupled to a lower portion of the holder;

a housing coupled to the holder;

a first space formed below the holder by coupling the holder and the substrate; and a second space formed outside the first space by coupling the holder and the housing, wherein the holder includes a first protrusion protruding in a first direction parallel to an optical axis of the lens, and a second protrusion protruding in a second direction perpendicular to the optical axis of the lens, and wherein the first protrusion includes an opening connecting the first space and the second space.

13. The camera module according to claim 12, wherein the opening is at least one hole penetrating the first protrusion in the second direction.

14. The camera module according to claim 13, wherein the hole has a width of 0.3 mm to 0.5 mm.

15. The camera module according to claim 13, wherein the hole has a cross-section of any one of a circular shape, an oval shape, a square shape, and a polygonal shape.

16. The camera module according to claim 12, wherein the opening is a path for discharging air in the first space toward the second space.

17. The camera module according to claim 12, wherein the housing is coupled to the second protrusion.

18. The camera module according to claim 12, wherein the first protrusion includes a lower surface facing the substrate, and the lower surface of the first protrusion and the upper surface of the substrate are connected by a first adhesive.

19. The camera module according to claim 18, wherein the lower surface of the first protrusion and the upper surface of the substrate are spaced apart from each other at a predetermined distance.

* * * * *